United States Patent
August et al.

(10) Patent No.: US 8,125,340 B2
(45) Date of Patent: Feb. 28, 2012

(54) SMARTBEAM VISIBILITY NETWORK

(75) Inventors: M Jason August, Toronto (CA); John Stevens, Stratham, NH (US); Alexander Tkachenko, Etobicoke, CA (US); Paul Waterhouse, Selkirk, CA (US)

(73) Assignee: Visible Assets, Inc., Mississauga, Ontario (CA)

( * ) Notice: Subject to any disclaimer, the term of this patent is extended or adjusted under 35 U.S.C. 154(b) by 0 days.

(21) Appl. No.: 12/897,755

(22) Filed: Oct. 4, 2010

(65) Prior Publication Data

US 2011/0018690 A1 Jan. 27, 2011

Related U.S. Application Data

(63) Continuation of application No. 11/960,533, filed on Dec. 19, 2007, and a continuation-in-part of application No. 12/028,483, filed on Feb. 8, 2008, application No. 12/897,755, which is a continuation-in-part of application No. 12/030,734, filed on Feb. 13, 2008, application No. 12/897,755, which is a continuation-in-part of application No. 12/719,351, filed on Mar. 8, 2010, which is a continuation-in-part of application No. 11/677,037, filed on Feb. 20, 2007, now Pat. No. 7,675,422, which is a continuation-in-part of application No. 11/461,443, filed on Jul. 31, 2006, now Pat. No. 7,277,014, which is a continuation-in-part of application No. 11/276,216, filed on Feb. 17, 2006, now Pat. No. 7,164,359, which is a continuation of application No. 10/820,366, filed on Apr. 8, 2004, now Pat. No. 7,049,963.

(60) Provisional application No. 60/889,198, filed on Feb. 9, 2007, provisional application No. 60/889,902, filed on Feb. 14, 2007, provisional application No. 60/461,562, filed on Apr. 9, 2003.

(51) Int. Cl.
G08B 13/14 (2006.01)

(52) U.S. Cl. ............. 340/572.1; 340/10.1; 340/540

(58) Field of Classification Search ............. 340/572.1, 340/10.1, 540, 665
See application file for complete search history.

(56) References Cited

U.S. PATENT DOCUMENTS

| | | | | |
|---|---|---|---|---|
| 7,049,963 | B2 * | 5/2006 | Waterhouse et al. | 340/572.1 |
| 7,319,397 | B2 * | 1/2008 | Chung et al. | 340/572.4 |
| 2004/0217864 | A1 * | 11/2004 | Nowak et al. | 340/572.1 |
| 2007/0033108 | A1 * | 2/2007 | Luhr | 705/22 |
| 2007/0096875 | A1 * | 5/2007 | Waterhouse et al. | 340/10.1 |
| 2007/0210929 | A1 * | 9/2007 | Sabata et al. | 340/686.5 |

* cited by examiner

Primary Examiner — Travis Hunnings
(74) Attorney, Agent, or Firm — Larson & Anderson, LLC

(57) ABSTRACT

A method for providing real-time visibility on a construction project includes steps of: attaching a low-frequency, ultra low-power, two-way transceiver radio tag to each construction material to be used in the construction project; storing data relating to the construction material in the tag; and reading the data from the transceiver of the tag by interrogating the radio tag with radio frequency interrogation signals.

40 Claims, 8 Drawing Sheets

FIG. 4
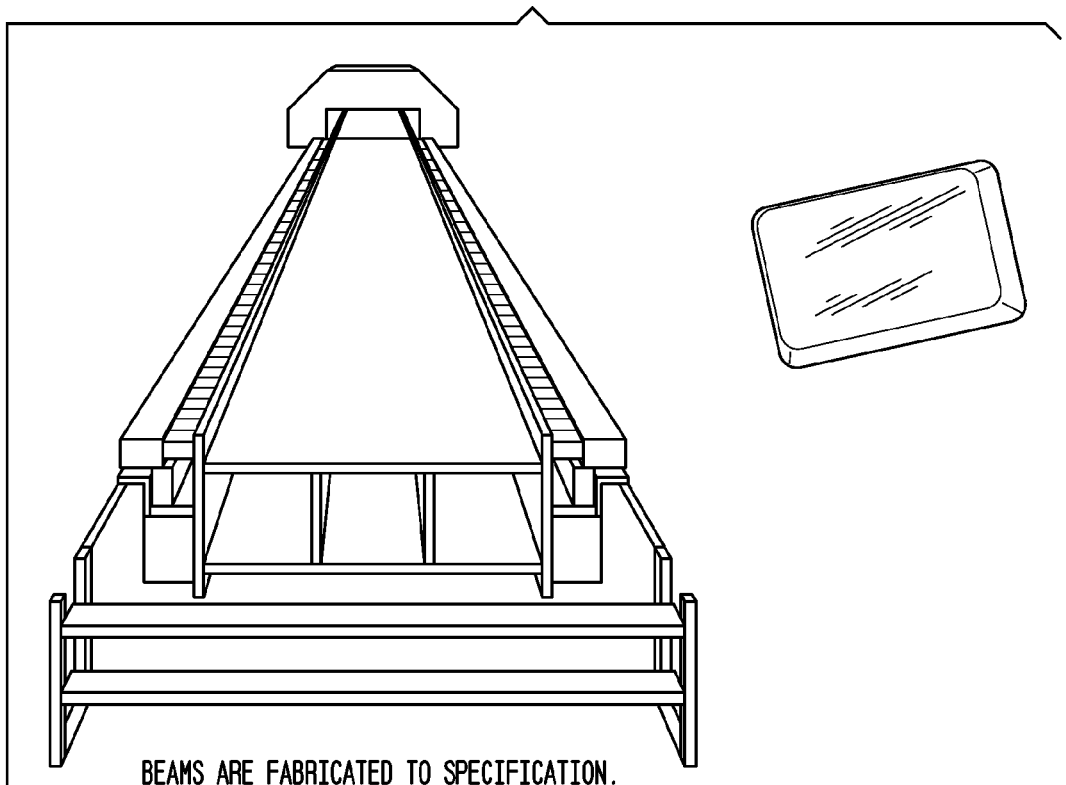
BEAMS ARE FABRICATED TO SPECIFICATION.
THE FULL SPEC GOES INTO TAGS ATTACHED ON EACH
NODE END OF THE BEAM. THIS DATA COMES FROM
ORIGINAL DESIGN SPECIFICATION.
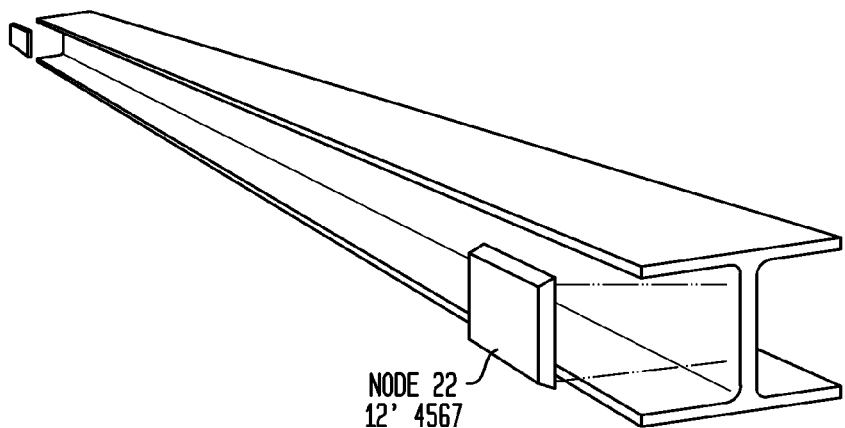
NODE 22
12' 4567

PHYSICAL INVENTORY IS TAKEN VIA THE TAGS
IN ALL STORAGE AREAS. SPECIFIC BEAMS
MAYBE IDENTIFIED AND LOCATED QUICKLY i-Beams placed in the structure based on original drawing. Each node is crosschecked via tags. Total QC on welds, torque wrenches, people and the fact that each beams is in correct location, based on original plans with total visibility.

SMARTBEAM VISIBILITY NETWORK

CROSS-REFERENCE TO RELATED APPLICATIONS

The present application is a continuation of U.S. patent application Ser. No. 11/960,533 filed Dec. 19, 2007, which is incorporated herein by reference for all purposes.

The present application is a continuation-in-part of U.S. patent application Ser. No. 12/028,483 filed Feb. 8, 2008, which claims the benefit of U.S. Patent Application Ser. No. 60/889,198 filed Feb. 9, 2007, all of which are incorporated herein by reference for all purposes.

The present application is a continuation-in-part of U.S. patent application Ser. No. 12/030,734 filed Feb. 13, 2008, which claims the benefit of U.S. Patent Application Ser. No. 60/889,902 filed Feb. 14, 2007, all of which are incorporated herein by reference for all purposes.

The present application is a continuation-in-part of U.S. patent application Ser. No. 12/719,351 filed Mar. 8, 2010, which is a continuation of U.S. patent application Ser. No. 11/677,037 filed Feb. 20, 2007, now U.S. Pat. No. 7,675,422. U.S. patent application Ser. No. 11/677,037 is a continuation-in-part of U.S. patent application Ser. No. 11/461,443 filed Jul. 31, 2006, now U.S. Pat. No. 7,277,014; which is a continuation of U.S. patent application Ser. No. 11/276,216 filed Feb. 17, 2006, now U.S. Pat. No. 7,164,359; which is a continuation of U.S. patent application Ser. No. 10/820,366, filed Apr. 8, 2004, now U.S. Pat. No. 7,049,963; which claims the benefit of U.S. Patent Application Ser. No. 60/461,562 filed Apr. 9, 2003, all of which are incorporated herein by reference for all purposes.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

TRADEMARKS

RuBee™ is a registered trademark of Visible Assets, Inc. of Canada. Other names used herein may be registered trademarks, trademarks or product names of Visible Assets, Inc. or other companies.

FIELD OF THE INVENTION

The invention disclosed broadly relates to the field of visibility, and in particular to a visibility network of construction materials.

BACKGROUND OF THE INVENTION

In the building industry, as structures become larger and more complex, so do the costs and complexity associated with designing, building and maintaining the structures. In this, as in most areas of modern-day life, technology has provided high tech methodologies to improve some aspects of the building process. For example, computer aided design (CAD) software is now widely used throughout the building industry to automate and improve the design process.

FIG. 1 shows an exemplary CAD screenshot used in steel beam design in order to set out the material, dimensions, and so forth, to be fabricated. FIG. 2 shows another screenshot providing more detail on the design of one steel beam, showing the detailing dimensions. CAD software is also used to generate the bill of material (the parts list of materials accompanying a structural drawing). From single-family homes to skyscrapers, building projects use CAD to generate a design specification and bill of materials for a building project.

However, once the design is formulated and the construction begins, high technology is nowhere to be found in the building process. It would be useful to continue using technology throughout the entire building process, not just the design process.

BACKGROUND OF THE INVENTION

Briefly, according to an embodiment of the invention, method for providing real-time visibility on a construction project includes steps of: attaching a low-frequency, ultra low-power, two-way transceiver radio tag to each construction material to be used in the construction project; storing data relating to the construction material in the tag; and reading the data from the transceiver of the tag by interrogating the radio tag with radio frequency interrogation signals.

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 4 shows a tag affixed to a beam, according to an embodiment of the present invention;

DETAILED DESCRIPTION

We describe a smart visibility network for the building trade, providing total quality control and monitoring for all phases of a building project, from fabrication to post-construction. We focus our examples in the area of steel beam construction; however, the smart visibility network that will be described herein can be advantageously used in conjunction with other processes.

Figure 1:
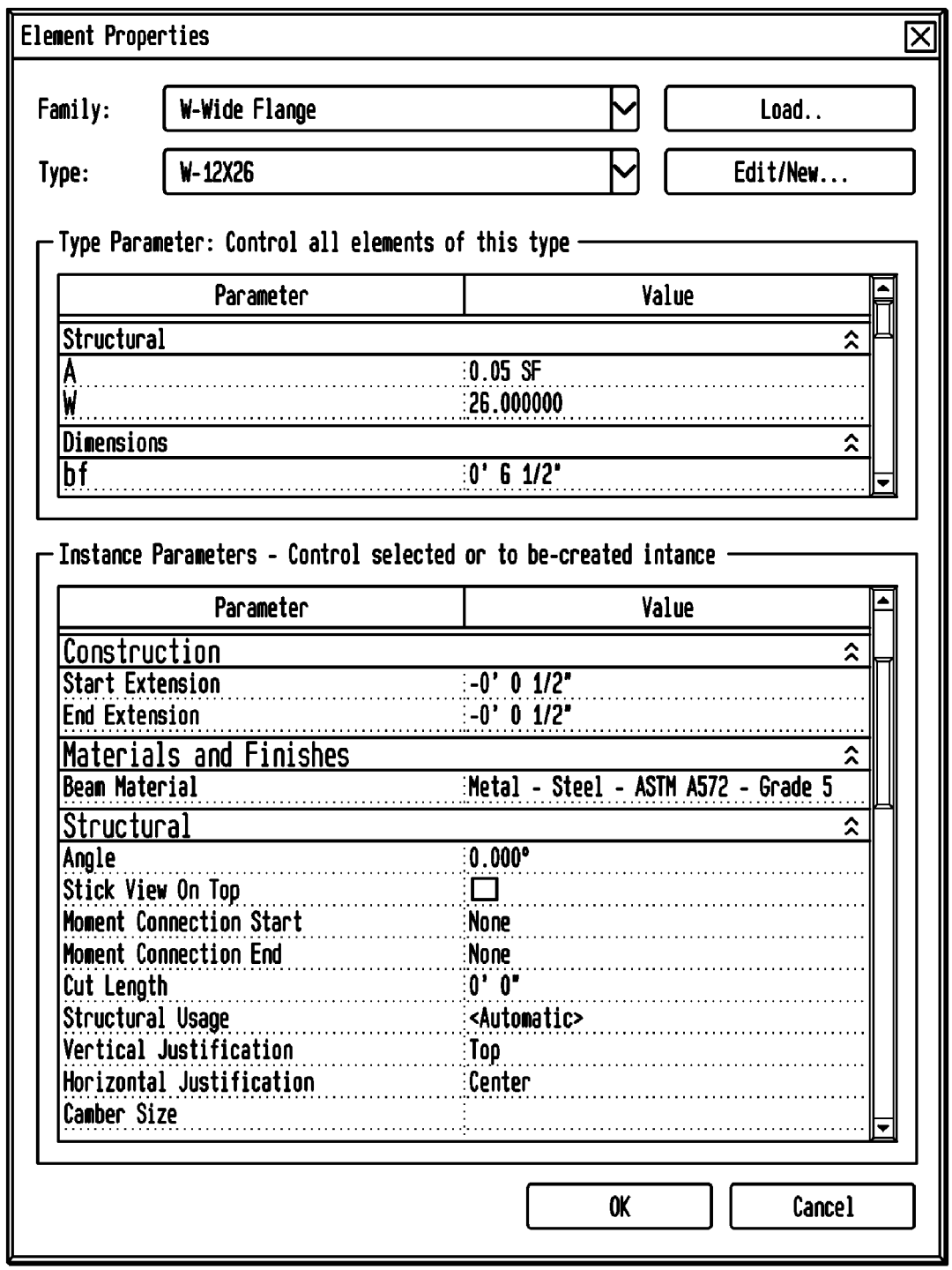
FIG. 1 shows a screenshot from a CAD program for steel beam construction, according to the known art.
Figure 2:
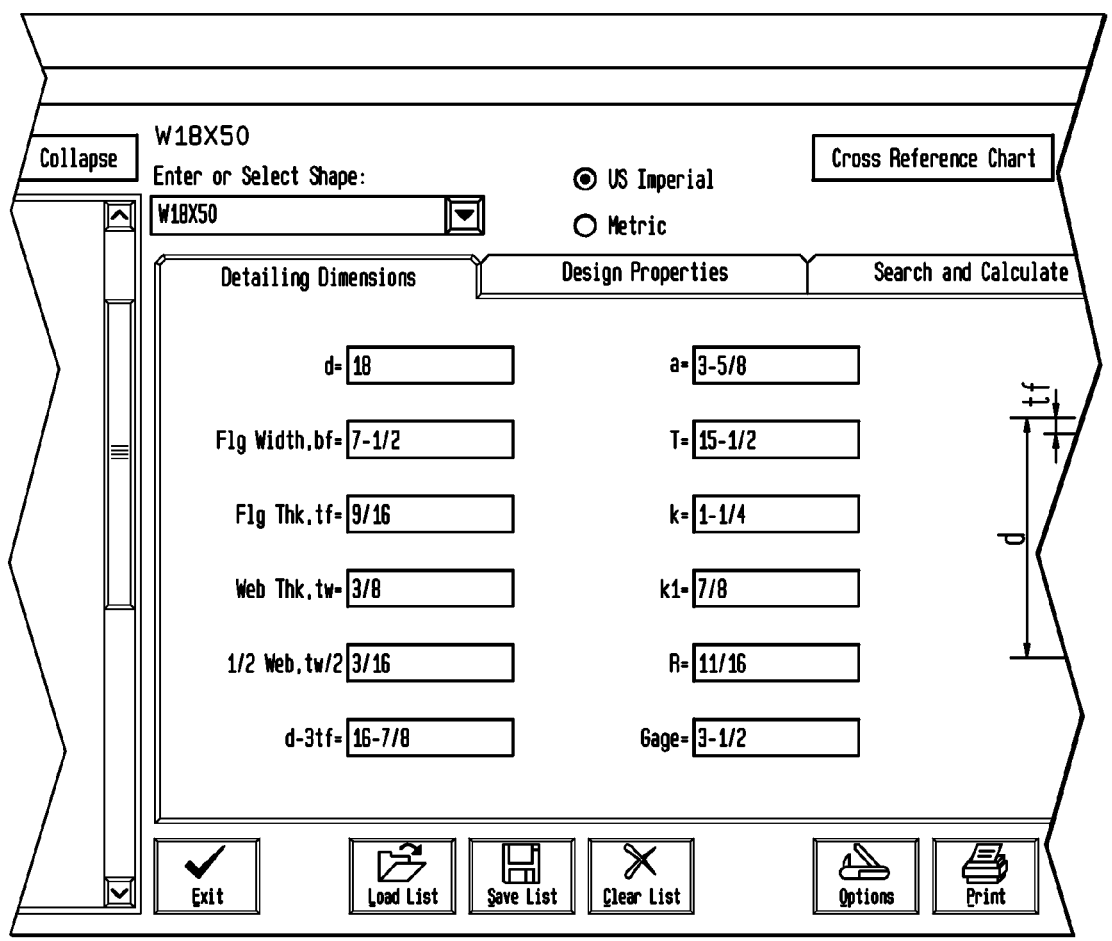
FIG. 2 shows a screenshot providing more detail of how CAD software is used in steel beam construction, according to the known art.
Figure 3:
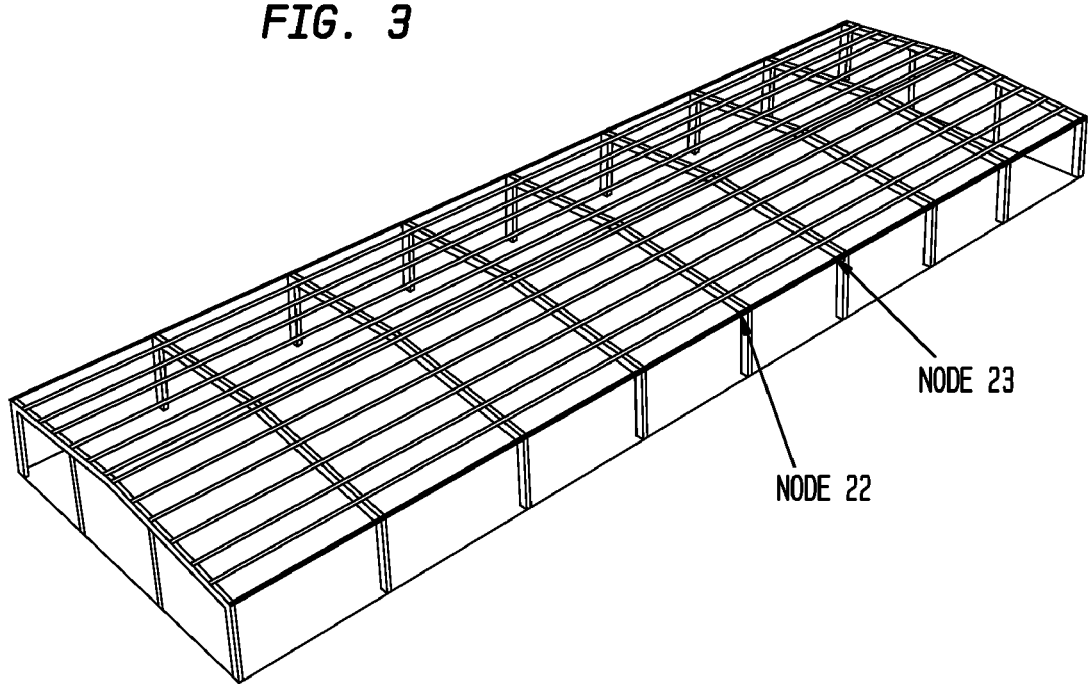
FIG. 3 shows a CAD layout of a steel beam, showing the placement of tags on the end nodes, according to an embodiment of the present invention; according to another embodiment of the present invention.

Steel beam construction design begins with a CAD layout. From this layout, the bill of materials is generated, along with the beam specification for fabrication and construction. The beams are then fabricated according to specification. According to an embodiment of the present invention, after the beams are fabricated, a visibility tag is attached to each node end of the steel beam. Referring to FIG. 3, note the CAD-generated steel-beam drawing. In FIG. 3 two beams, 22 and 23, are selected to illustrate where the tags will be placed.

Figure 5:
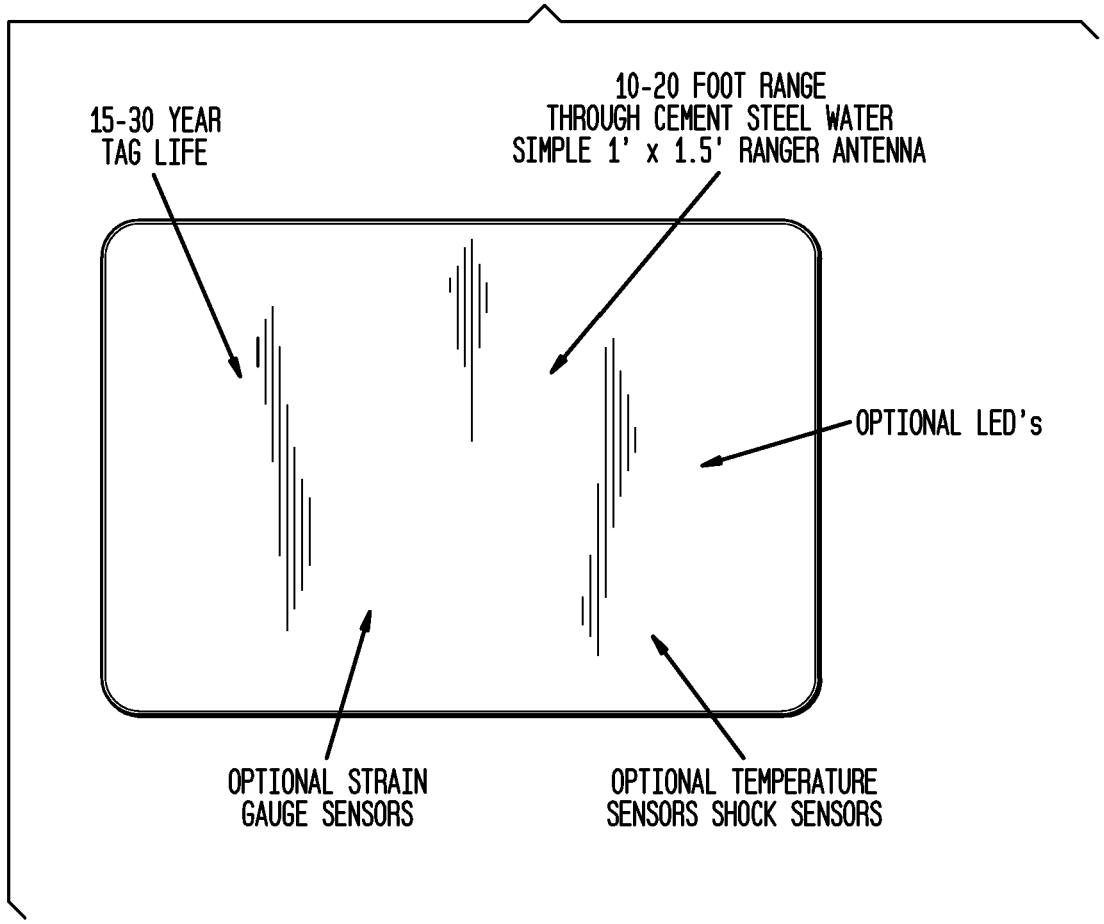
FIG. 5 shows a close-up view of the tag, according to an embodiment of the present invention.

Referring to FIG. 4 there is shown a tag 40 and its placement on beam 22. The tag 40 can be affixed to the beam with adhesive, or by any other means that withstands temperature change and movement. FIG. 5 shows a close-up view of the tag 40, shown with a penny to highlight the diminutive size of the tag 40. Because the tags 40 are small, lightweight and inexpensive, they can be placed on a wide variety of objects used in construction, from welding tools to concrete mixers. The construction workers can also carry identification cards containing a tag (See commonly-owned U.S. Patent Application No. 60/889,198), or optionally, their helmets can be affixed with a tag 40.

The tag 40 contains an antenna 41, data storage (not shown), optional LEDs (light-emitting diodes) 42 and optional sensors 43. The components of an exemplary tag 40 have been described in various commonly-owned patent applications. Please refer to, for example, U.S. Ser. No. 11/353,766, "Ultra Low Frequency Tag and System," filed on Feb. 14, 2006; U.S. Pat. No. 7,049,963, "Networked RF Tag for Tracking Freight," filed on Apr. 8, 2004; and U.S. Pat. No. 7,277,014, "Networked RF Tags for Tracking Animals," filed on Jul. 31, 2006.

Following is a brief description of the technology used:

The RuBee™ radio frequency protocol is a long wavelength (LW), inductive, ultra low power, two-way, transceiver radio tag communication protocol. RuBee™ was designed to work reliably over a long-range, wide area (1'-100'), in harsh environments (near metals and liquids), with an extended battery life (10-15 years) and a safety standard consistent for use in any healthcare application. The original design goal was to create a low cost two-way radio tag that could be safely used in hospital patient-based settings, hospital operating rooms, airports, heavy industry and public facilities with no risk to hearing aid wearers, pacemaker or IDC patients, and with no electromagnetic interference (EMI) or electromagnetic compatibility (EMC) issues and high data reliability.

The RuBee™ protocol uses a full duplex 131 KHz data carrier with amplitude modulated data communications. The long wavelength produces little, if any, energy in the form of an electrical field (E), and most radiated energy (99.99%) is in the form of a magnetic field (H). The radio tags typically need a minimum signal of 0.1 milligauss to a maximum of about 300 milligauss for reliable communication. The strongest field near or on top of a base station and high performance (HP) antenna can be about 1,000 milligauss, however most standard antennas are in the 100-800 milligauss range. To provide some context for these values, the earth's magnetic field is 300-600 milligauss.

For these reasons, RuBee™ tags are ideal for use in a heavy industrial setting, near arc welders, welding equipment, and high current welding cables. RuBee™ technology is a low-frequency visibility network protocol that delivers a number of advantages over conventional RFID tags. RuBee™ tags can be made as thin as 1.5 mm and will work in underwater and underground environments that obstruct higher-frequency RFID signals. RuBee™ technology offers supply chain and asset visibility platforms to customers in a variety of industry sectors where real time asset determination is needed.

By networking the tags, a quality control visibility network is generated. The RuBee™ network is able to: 1) manage consumable on-site inventory (wire, spools) and provide just in time events and point of use data; 2) manage use of welding machinery; ID of welder by means of RuBee™ ID card, wire type and feed rates (for the livestock industry); 3) create an active visibility network that provides critical information on the floor in any language; 4) check-in and check-out functions for tools, tips and wire; 5) provide legal audit trails under 21CFRPart11, as well as Sarbanes Oxley logs (SOX logs) linked to use of product; and 6) optionally provide a visibility pedigree and quality control data permanently attached to the product.

The RuBee™ protocol works with both active radio tags and passive tags that have no battery. A controlled reading range of 1 to 100 feet and an integrated clock ensure high security and privacy. The ability of RuBee™ tags to maintain performance around steel removes a key obstacle for low-cost deployment of RFID in retail environments where steel shelving is commonly used.

Steel Beam Embodiment.

Each tag 40 contains the full specification for the beam, as produced by the original design specification. Also, each tag 40 includes a unique identifier so that the beams may be distinguished, one from another. Once the tags 40 are affixed to the steel beams, the beams form part of a visibility network. The data in the tags 40 can be read by a handheld reader or by a base station reader, or another tag. Through the data in the tags, the beams can be identified, located, and inventoried remotely and/or on-site. The data may also be encrypted.

Because RuBee™ tags are two-way radio tags, data may be written to the tags 40 as well as read from the tags 40. Data can be written to the tag before and after it is attached to the beam. Note that the data contained in each tag 40 can be read using a handheld reader, or a computer. The data may be read via a web browser. An on-board crystal can provide time-stamps so that a temporal history of events can be generated to produce a report. The tag 40 can be programmed to log the status of the beam at pre-determined intervals of time or when a status event occurs. The status event can be movement, or jog, detected by an acceleration sensor, a change in temperature, or another event. Using timestamps, the events can be cross-referenced with a timestamp to produce a temporal history.

The visibility network provides many features, as stated earlier. For example, construction quality control is improved because the remote monitoring can be used to assist in the placement of the beams in order to assure conformity to the design specification. Each node of the beams can be cross-checked via the attached tags. Additionally, in combination with an identification tag used by a worker, the network can be used to cross-reference the beams with the worker or workers who installed them, thus providing total quality control on the sub-processes involved in any construction project, such as placement, and welding. The tags can also be affixed to construction tools and equipment, such as torque wrenches, welds, jackhammers, and so on. All of the data from the tags 40 can be transmitted to a central monitoring station where the construction project can be monitored.

Figure 6:
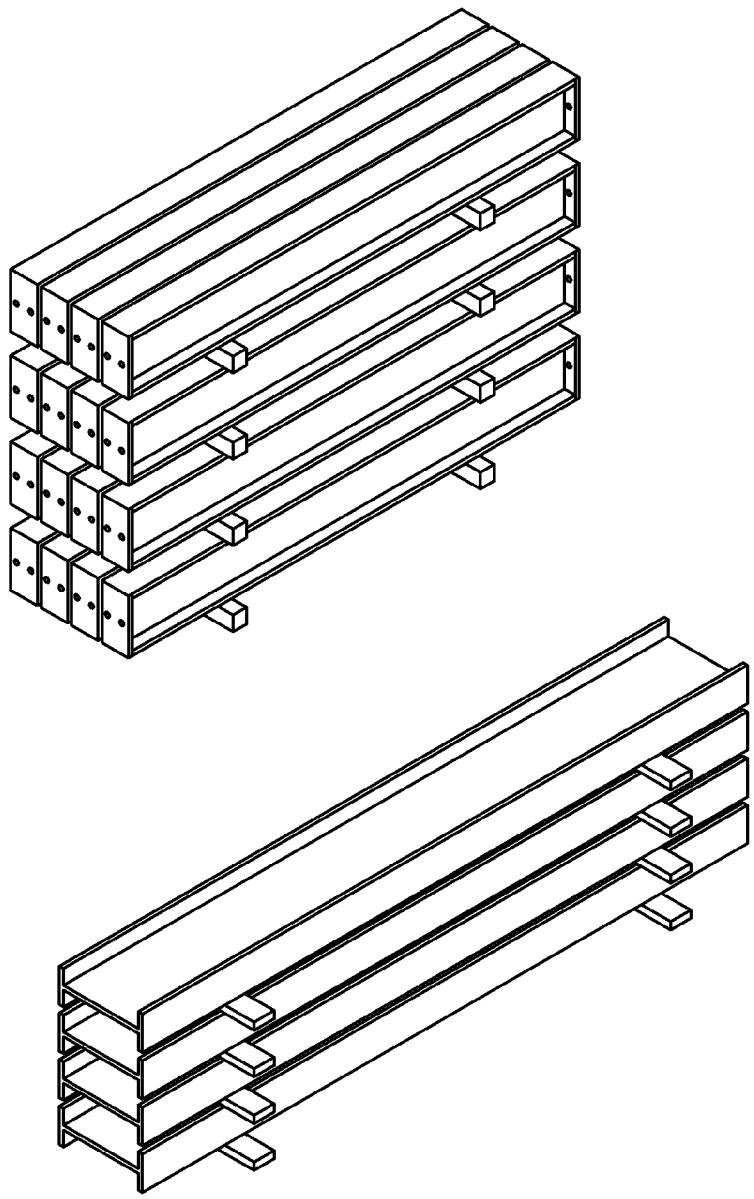
FIG. 6 shows two sets of steel beams with tags, according to an embodiment of the present invention.

FIG. 6 shows two sets of steel beams, one set stacked on the factory floor, the other on site. Using the tags 40, each and every beam can be accounted for from fabrication to post-construction, including transport.

Figure 7:
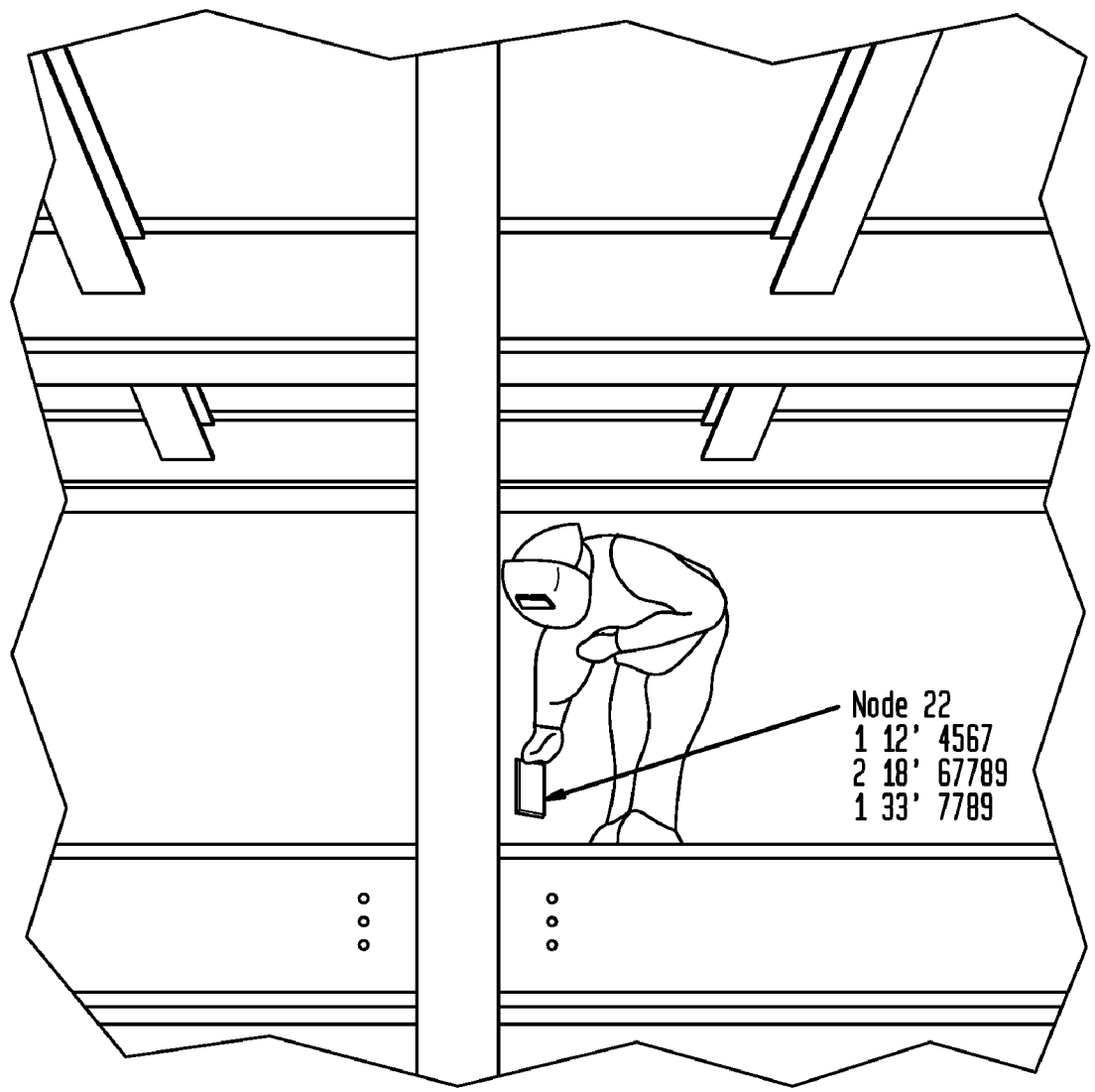
FIG. 7 shows a steel beam during construction, according to an embodiment of the present invention.

FIG. 7 is a photograph showing the placement of beam 22 during the construction process. As shown here, i-beam 22 is placed on an upper floor of a building. At this point in the construction process, known methods of quality control can only be assured by an on-site inspection. This involves someone, perhaps a job foreman, visually inspecting the placement of the beam 22 and the corresponding fittings to be certain that the beam 22 is correctly positioned, and adequately welded and braced. In order to ensure quality control, this must be done for each and every beam. Inspection is often hampered by location and weather. For example, visually inspecting beams in the upper floors of a high-rise building or across an unfinished bridge is a daunting task. Factor in high winds and the task becomes impossible.

Using the tags 40 as part of a visibility network, quality control can be assured for each and every beam from a safe, remote location. Quality control begins as soon as the beams are placed. Keep in mind that the tags 40 are networked and can communicate with each other. As stated earlier, each tag 40 in the building project can be loaded with the specification for the beam on which that tag 40 is attached. Additionally, each tag 40 can contain the specification for a portion of the structure, or the entire structure. The limiting factor here is the amount of data that each tag 40 can hold.

Given this information, one can appreciate that the beams themselves can determine if their placement is correct and emit a warning signal if they determine that the placement is incorrect. For example, assume that the specification for beam 23 mandates that it be placed twelve inches from beam 22, parallel to beam 22 and that it should span and be welded to the same cross-beams as beam 22. Beam 23 emits signals to determine if beam 22 is within range. An answering signal from beam 23 will confirm this. Beam 23 will also communicate with the cross-beams. If the positioning does not conform to the specification, the beams can emit warning signals, either audibly or via the LEDs 41.

The beam tags can be programmed to check their positioning responsive to an indicator from a temperature sensor 43 located on the tag 40. Once the temperature sensor 43 detects a rapid increase in temperature this indicates that welding has begun. At this point, before the welding is completed, the tag 40 communicates with the tags 40 in its network to check the placement. Note that this is just one possible scenario of how the networked tags 40 can be used.

Not only are the tags 40 affixed to the beams networked, but each worker and tool can also be monitored and cross-referenced with the beams in order to provide a full visibility network for a building and/or building project. The boundaries of the network can be determined ahead of time. A network may encompass one floor of a structure, one structure (building or bridge), or a grouping of structures.

The tags 40 and tag sensors 43 will continue to provide information on building integrity well beyond the completion of the construction project. The tag sensors 43 can provide data on stress factors affecting the beams.

Figure 8:
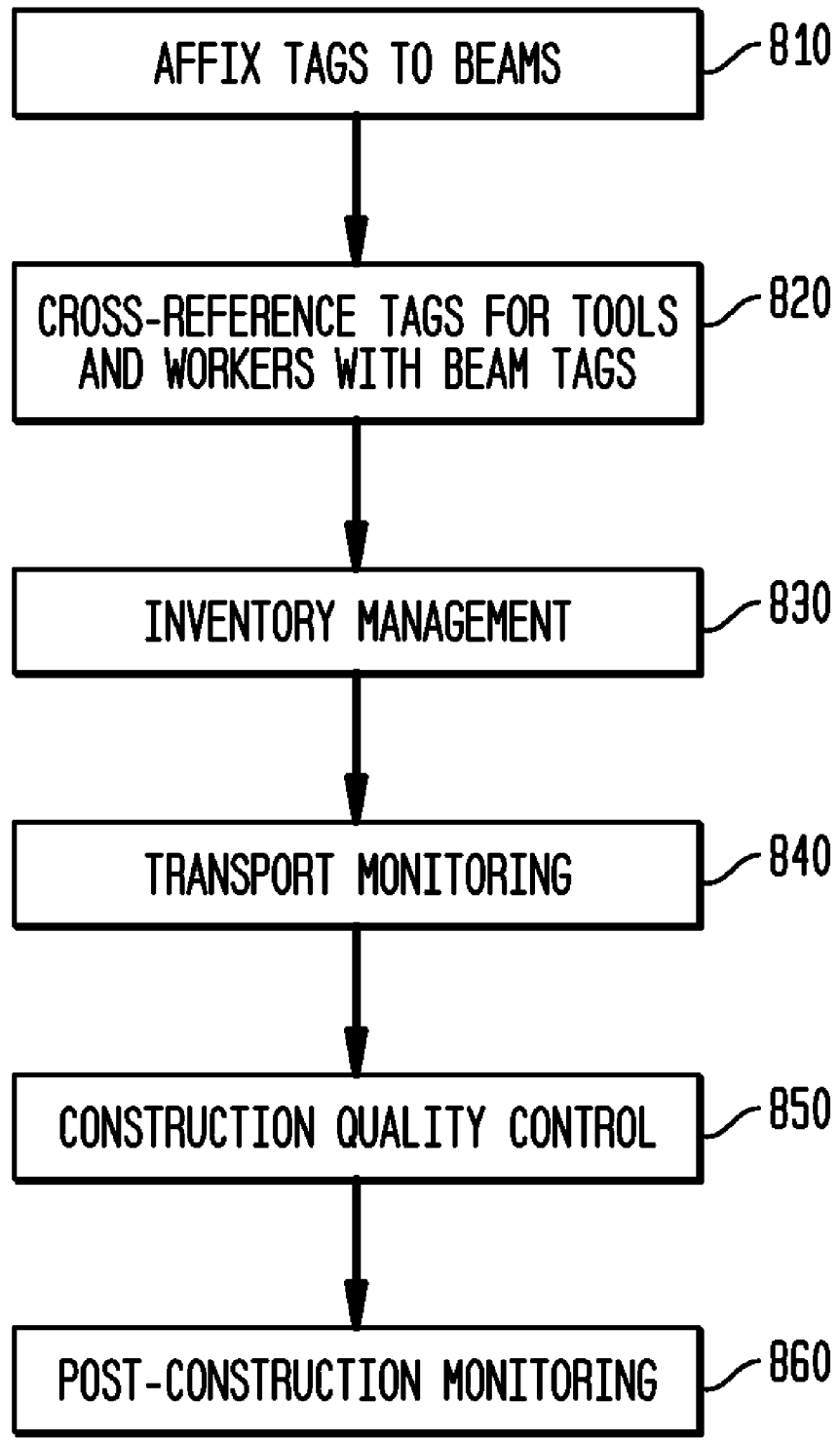
FIG. 8 is a flow chart of a method for providing total visibility for the building process, according to an embodiment of the present invention While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

Referring to FIG. 8 there is shown a flow chart of the total control visibility network processing according to an embodiment of the present invention. First in step 810, a visibility tag 40 is affixed to each node of a steel beam. The tag can be pre-programmed with a unique identifier for the beam or the identifier can be written to the tag after placement. This can be done remotely by a computer.

To complete the total visibility network, worker tags (either placed in identification cards or affixed to helmets) and tool tags can be cross-referenced with the beam in step 820. This provides quality management as well as inventory management. Information from the combination of the tags can be logged to provide a record of the work done by each worker on each workday, including the tools used.

After fabrication, the beams are stored in a warehouse as part of the inventory. The tags 40 now provide inventory management in step 830. During transport to the construction site, the tags provide transport monitoring in step 840.

At the construction site in step 850, the tags 40 provide total visibility during construction. The placement of the beams can be easily monitored and checked using the tags 40. Note that the specification for the beam is contained in the tag 40, thus providing a valuable reference that can be cross-checked during the actual placement of the beams. The beam specification may be easily read by the construction worker using a handheld reader. Optionally, an engineer can check the specification from a remote system.

During the post-construction phase in step 860, the tags 40 will continue to provide information, as needed. Construction sites are often plagued with theft of equipment and supplies. During post-construction clean-up, the tools and equipment can be easily inventoried and tracked using the tags 40. Building integrity can be continuously monitored remotely.

Therefore, it will be understood by those skilled in the art that other modifications can be made within the spirit of the invention. The above descriptions are not intended to be exhaustive or limiting in scope, but are to be construed according to the appended claims.

We claim:

1. A method for providing real-time visibility on a construction project, said method comprising steps of:
   attaching a low frequency, ultra low power, two-way transceiver radio tag to each item of construction material to be used in the construction project, said radio tag comprising:
      a tag antenna operable at a low radio frequency not exceeding 450 kilohertz,
      a transceiver operatively connected to said antenna, said transceiver being operable to transmit and receive data signals at said low radio frequency,
      a data storage device configured to store data comprising identification data for identifying said radio tag, said data storage device being configured to write data before and after the radio tag is attached to an item of construction material,
      a data processor operable to process data received from said transceiver and said data storage device and to send data to cause said transceiver to emit an identification signal based upon said identification data stored in said data storage device, and
      an energy source for activating said transceiver and said data processor;
   storing, in the data storage device of the radio tag, specification data relating to said construction material on which the tag is affixed;
   networking the radio tags; and
   reading the specification data from the transceiver of the radio tag.

2. The method of claim 1 wherein reading the identification data comprises interrogating said radio tag with radio frequency interrogation signals at a low radio frequency not exceeding 450 kilohertz via said tag antenna.

3. The method of claim 2 further comprising a step of:
   during construction, cross-checking actual placement of the construction material with a specification by communicating with at least one other networked radio tag attached to an item of construction material to be used in the construction project to determine if the placement is correct.

4. The method of claim 3 wherein the cross-checking is done remotely.

5. The method of claim 1 further comprising the step of:
attaching the low frequency, ultra low power, two-way transceiver radio tags to tools and equipment to be used in the construction project,
wherein the radio tags are networked such that said radio tags communicate with each other.

6. The method of claim 1 further comprising a step of transmitting the identification data from the radio tag to a central data processor.

7. The method of claim 6 further comprising transmitting the data such that the data is viewable via a web browser.

8. The method of claim 1 wherein the storing step further comprises storing encrypted data.

9. The method of claim 1 wherein the storing step further comprises storing a unique identifier corresponding to the construction material, the unique identifier stored in the data storage device.

10. The method of claim 9 wherein the unique identifier is used as a key to access data about the construction material.

11. The method of claim 1 further comprising a step of:
receiving a status signal from at least one sensor located in the radio tag, the at least one sensor operable to generate a status signal upon sensing a pre-determined status condition.

12. The method of claim 11 wherein the pre-determined status condition comprises a sudden temperature increase.

13. The method of claim 11, further comprising steps of:
receiving a time signal corresponding to the status signal, said receiving step further comprising steps of:
receiving stored corresponding pairs of status and time signals as a temporal history of events experienced by the construction material; and receiving the temporal history as a report.

14. The method of claim 13, wherein the step of receiving a time signal is performed automatically upon receipt by the transceiver of the status signal.

15. The method of claim 13 further comprising a step of: emitting a warning signal upon receipt of the status signal.

16. A system for providing real-time visibility for a building project, the system comprising a network of:
a low frequency networked radio tag attached to construction materials, said radio tag configured to receive and send data signals, the radio tag comprising:
a tag antenna operable at a low radio frequency not exceeding 450 kilohertz,
a transceiver operatively connected to the tag antenna, said transceiver configured to transmit and receive data signals at the low radio frequency;
a data storage device configured to store data comprising identification data for identifying the construction materials and specification data relating to the construction materials, wherein the data storage device is configured to write data before and after the tag is attached to an item of construction material, and
a data processor configured to process data received from the transceiver and the data storage device and to transmit data to cause said transceiver to emit an identification signal and specification data based upon the identification data and specification data stored in said data storage device.

17. The system of claim 16, wherein the low frequency networked radio tags are attached to building tools and equipment.

18. The system of claim 17 wherein the network further comprises radio tags associated with personnel working with the construction materials.

19. The system of claim 16, wherein the identification data comprises an Internet protocol address, and the data processor is operable for communication with an Internet router using said Internet protocol address, such that at least a portion of the identification data can be transmitted through the Internet router to be viewable through a web browser.

20. The system of claim 16, wherein the radio tag further comprises at least one sensor operable to generate a status signal upon sensing a pre-determined status condition.

21. The system of claim 20, wherein another radio tag within the network is operable to receive the transmitted status signal through its transceiver and wherein the another radio tag is operable to respond to this signal.

22. The system of claim 20 wherein the transceiver is operable to automatically emit a warning signal at the low radio frequency upon generation of the status signal by the at least one sensor.

23. The system of claim 22, wherein the radio tag further comprises: a clock operable to generate a time signal corresponding to the status signal, and wherein the data storage device is operable to store corresponding pairs of status and time signals as a temporal history of conditions experienced by said construction material.

24. The system of claim 23, wherein the transceiver is operable to automatically transmit the temporal history at the low radio frequency upon receipt by said transceiver of a data signal that corresponds to the identification data stored in the data storage device.

25. The system of claim 16, wherein the radio tag further comprises:
an onboard crystal used for data encryption.

26. The system of claim 16, further comprising: an energy source operable for activating the transceiver and the data processor.

27. The system of claim 16, further comprising:
a reader in operative communication with the tag antenna, said reader configured to receive data signals from the radio tag.

28. The system of claim 27, further comprising:
at least one field antenna disposed at an orientation and within a distance from the radio tag that permits effective communication therewith at the low radio frequency.

29. The system of claim 28, wherein the at least one field antenna comprises a large loop, wherein a distance from the at least one field antenna to the tag does not exceed a major dimension of said large loop.

30. The system of claim 28 wherein the at least one field antenna is positioned vertically.

31. The system of claim 28 wherein the at least one field antenna is a loop antenna.

32. The system of claim 28 wherein the at least one field antenna, the reader, and a transmitter are combined into a handheld device configured for reading and transmitting signals to and from the radio tag.

33. The system of claim 27 further comprising:
a central data processor in operative communication with the reader.

34. The system of claim 27 wherein the reader, at least one field antenna, and a transmitter are combined into a handheld device configured for reading and transmitting signals to and from the radio tag.

35. The system of claim 16, further comprising:
a transmitter in operative communication with the tag antenna, said transmitter being operable to send data signals to the radio tag.

36. The system of claim 35 wherein the transmitter is in communication with at least one field antenna.

37. The system of claim 35 wherein the transmitter, at least one field antenna, and a reader are combined into a handheld device configured for reading and transmitting signals to and from the radio tag.

38. The system of claim 35, further comprising:
a central data processor in operative communication with the transmitter.

39. The system of claim 16 wherein the data storage device is further configured for storing a building specification for the construction material.

40. The system of claim 16, wherein actual placement of the construction materials is cross-checked with a specification in real-time by communication between networked radio tags attached to items of construction material to be used in the building project.

\* \* \* \* \*